United States Patent [19]
Slais

[11] Patent Number: 5,860,681
[45] Date of Patent: Jan. 19, 1999

[54] CONNECTING BLOCK WITH INSERTS

[75] Inventor: Robert J. Slais, West Bloomfield, Mich.

[73] Assignee: Automotive Fluid Systems, Inc., Troy, Mich.

[21] Appl. No.: 926,957

[22] Filed: Sep. 10, 1997

Related U.S. Application Data

[63] Continuation of Ser. No. 475,799, Jun. 7, 1995, abandoned, which is a continuation-in-part of Ser. No. 344,150, Nov. 23, 1994, abandoned.

[51] Int. Cl.⁶ .................................................. F16L 37/26
[52] U.S. Cl. .................... 285/137.11; 285/325; 285/328; 285/124.3; 285/305; 248/74.1
[58] Field of Search .................................. 285/325, 305, 285/420, 425, 382, 137.11, 140.1, 328, 124.3; 248/56, 74.1; 403/320, 373, 374

[56] References Cited

U.S. PATENT DOCUMENTS

| | | |
|---|---|---|
| 706,974 | 8/1902 | Lyle . |
| 981,802 | 1/1911 | Shufflebottom et al. ........... 403/320 X |
| 1,069,937 | 8/1913 | Goehst et al. ..................... 248/74.1 X |
| 2,577,120 | 12/1951 | Franz . |
| 2,846,246 | 8/1958 | Peras . |
| 3,142,358 | 7/1964 | Woerheide, Jr. . |
| 3,374,014 | 3/1968 | Kull et al. ........................... 285/382 X |
| 3,572,778 | 3/1971 | Cassel .................................... 285/382 |
| 3,869,152 | 3/1975 | DeVincent et al. . |
| 3,869,153 | 3/1975 | DeVincent et al. . |
| 3,929,356 | 12/1975 | DeVincent et al. . |
| 4,400,992 | 8/1983 | Londres ............................. 248/74.1 X |
| 4,468,054 | 8/1984 | Orth . |
| 4,619,545 | 10/1986 | Kittenbaum ............................. 403/169 |
| 4,759,462 | 7/1988 | Neglio ............................... 285/137.1 X |
| 4,826,114 | 5/1989 | Umehara ................................ 248/74.1 |
| 5,078,432 | 1/1992 | Seiter . |
| 5,219,185 | 6/1993 | Oddenino ......................... 285/137.1 X |
| 5,234,185 | 8/1993 | Hoffman et al. . |
| 5,370,344 | 12/1994 | Nadherny ................................. 248/56 |
| 5,380,326 | 1/1995 | Lin ........................................... 403/13 |

FOREIGN PATENT DOCUMENTS

| | | |
|---|---|---|
| 0 481 871 | 4/1992 | European Pat. Off. . |
| 4-5764 | 2/1986 | Japan . |
| 140352 | 3/1920 | United Kingdom . |
| 167134 | 3/1922 | United Kingdom . |
| 328056 | 4/1930 | United Kingdom . |

*Primary Examiner*—Heather Shackelford
*Attorney, Agent, or Firm*—Vanophem Meehan & Vanophem, P.C.

[57] ABSTRACT

A tube mounting assembly for connecting a suction line tube and a liquid line tube to a housing, such as a compressor or evaporator, primarily consists of a mounting block having a first passage extending inwardly from one side thereof and a second passage also extending inwardly from a second side of the mounting block for receiving the suction line and liquid line tubes, respectively. Each of the first and second passages has a pair of opposing slots positioned adjacent their respective edges for receiving an insert designed to secure the respective suction line and inlet line tubes with the passages. The insert has a first side which corresponds with the suction line tube and a second side which corresponds with the inlet line tube and a pair of winged tabs for insertion into the opposing slots located adjacent the edge of the mounting block in the passage. The winged tabs of the inserts are designed to be press fit in the slots. The insert is designed such that the same insert can be used to retain either the suction line tube or the liquid line tube within the mounting block. In an alternative embodiment, the insert and tube have complimentary shaped portions to prevent rotation of the tube within the mounting assembly.

15 Claims, 2 Drawing Sheets

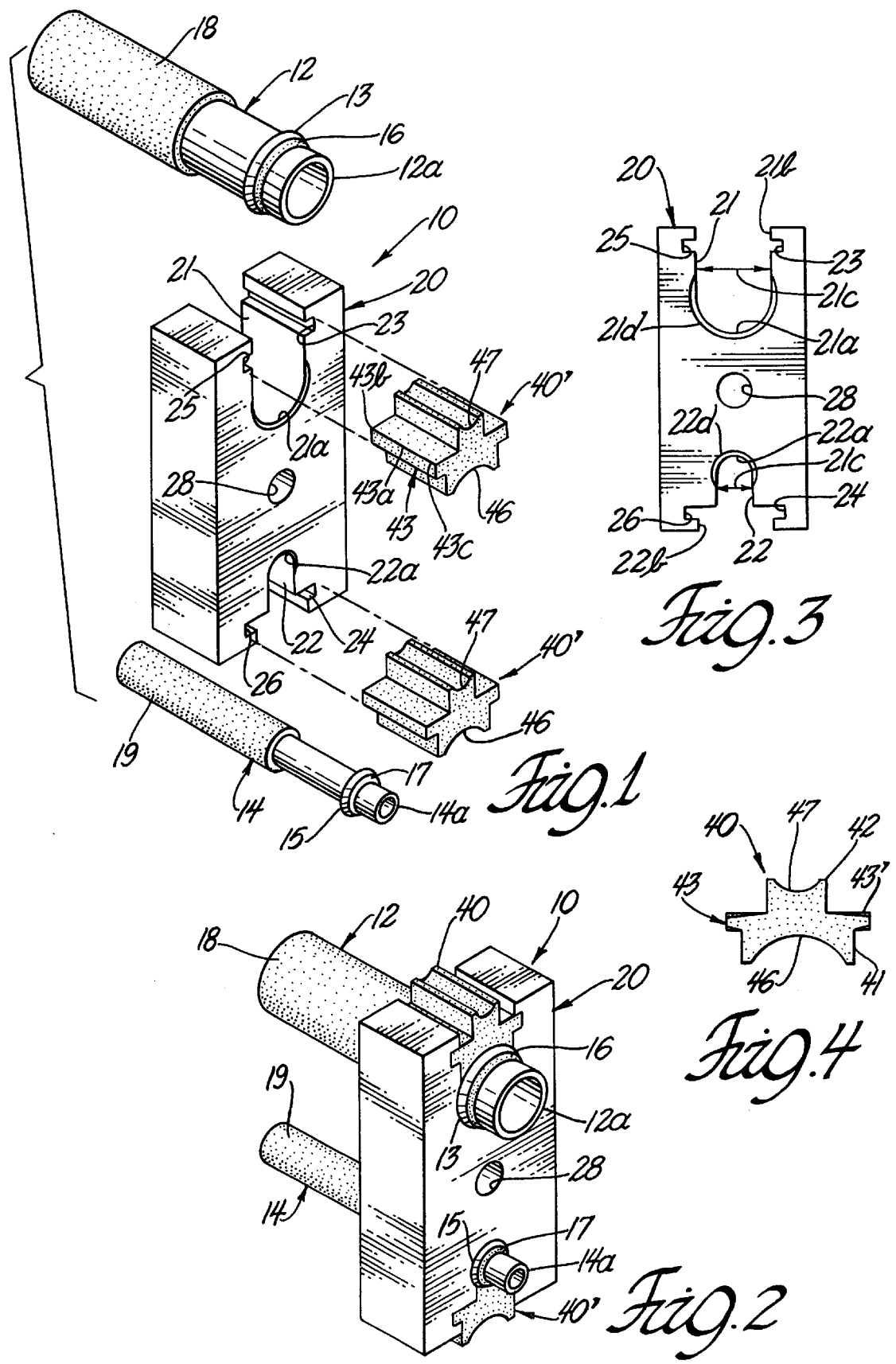

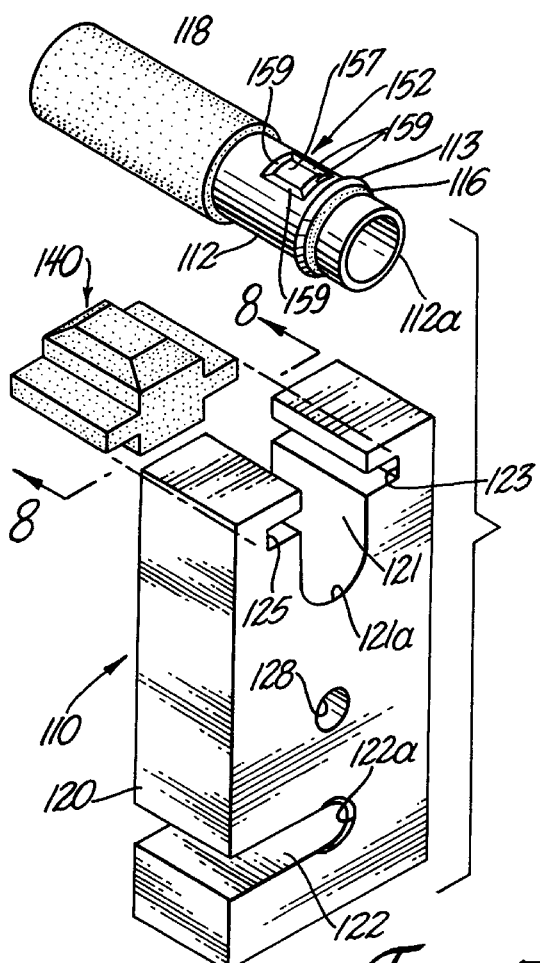
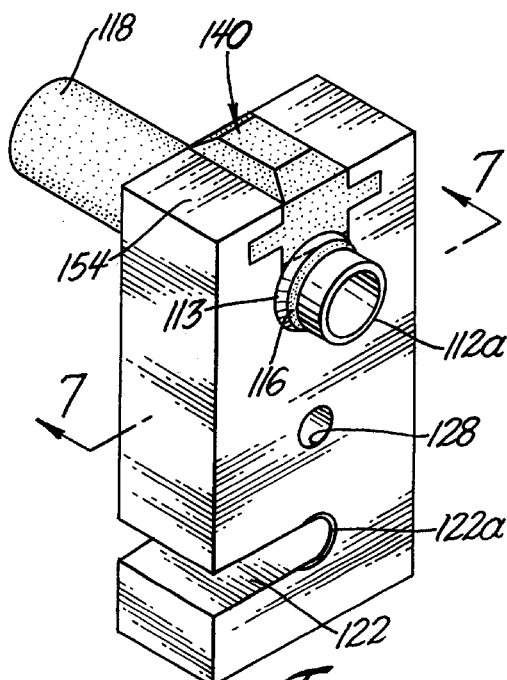
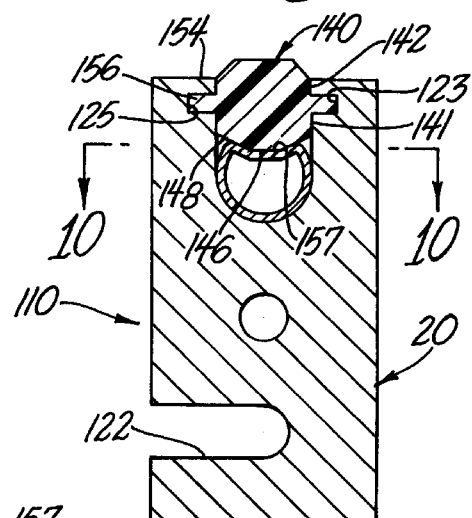
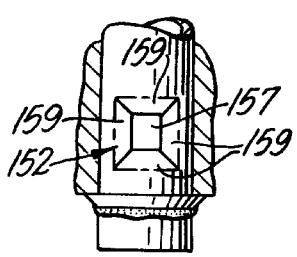
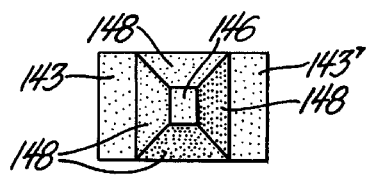

CONNECTING BLOCK WITH INSERTS

CROSS REFERENCE TO RELATED APPLICATION

This is a continuation application of application Ser. No. 08/475,799 filed on Jun. 7, 1995 now abandoned; which was a CIP of Ser. No. 08/344,150, filed on Nov. 23, 1994 also abandoned.

BACKGROUND OF THE INVENTION

1. Field of the Invention

The present invention relates to a device for connecting a tube to a port in a housing. More particularly, the present invention relates to a connecting block for connecting a conduit tube of an air-conditioning circuit to a port associated with an accessory, such as an expansion unit or compressor of a refrigerant circuit of the type typically used in automotive vehicle air-conditioning systems.

2. Description of the Prior Art

Prior to the present invention, multiple types of tube mounting assemblies have been proposed for connecting a refrigerant line to a device of an air-conditioning circuit, such as a compressor, expansion unit or other known device.

It is known in the art to connect refrigerant hoses to the discharge port or the inlet port of a refrigerant compressor evaporator or other device within an air-conditioning circuit using a tube fitting having one end thereof fixed to the flexible hose and its other end connected to the compressor. Such a tube fitting connection is typically made either by means of a male-female threaded tube coupling or it may be fixed, as by brazing, to a compressor connector block which would also have a short pilot tube fixed therein.

Additionally, it is also known that the tube can be adapted to enter a correspondingly sized hole or port in a connector block which is then fixed by a connecting means such as a threaded bolt or spanner clamp to the port in the compressor. However, this type of connection has its drawbacks with respect to the proper departure orientation of the tube fitting relative to the compressor, the limited availability of space in the engine compartment of the automotive vehicle and the significant weight associated with such devices. These types of tube fitting connections have drawbacks in that they have a significant number of potential leakage paths for the escape of the refrigerant fluid. Finally, with these prior art tube fitting connections a significant amount of machining is required to fabricate the male-female threaded tube coupling or to fabricate the compressor connector block and its associated components.

Accordingly, different types of solutions to the problems associated with the prior art devices have been proposed. For example, U.S. Pat. No. 3,869,152 to DeVincent et al discloses a tube mounting assembly for mounting a tube to a refrigerant compressor wherein the tube has an upset annular bead adjacent its free end which is sandwiched between the legs of a fold-over clamp against which an O-ring seal encircling the free end of the tube is seated to provide a seal. A pair of slotted tube mounting brackets are mounted in interlocking relationship with each other about each tube on the opposite sides of the fold-over clamp from the O-ring seal and then the entire assembly is secured to the housing of the compressor using a bolt.

Similar to the above patent is U.S. Pat. No. 3,929,356 to DeVincent et al. The '356 reference discloses that the upset annular bead on the end of the tube is received in a stepped bore opening of a connecting block and then a spring retainer clip is removably inserted in a transverse slot from a position out of interference engagement with the annular bead on the tube to a position in which it engages the opposite side of the bead. An O-ring is sandwiched between the upset annular bead and a step portion of the stepped bore opening of the passage in the connecting block in order to lock and effect sealing of the tube in the block. The '356 reference further discloses that the block may be sealed and attached to the housing of a compressor. Both of the above references disclose a means for connecting a tube to the housing of an air-conditioning compressor which requires a multitude of intricately formed parts which add significantly to the cost and weight of the overall design of the tube connecting assembly.

A further solution to a tube mounting assembly is U.S. Pat. No. 3,869,153 to DeVincent et al. The '153 patent proposes a tube mounting assembly in which the end of the tube having the annular upset bead adjacent the pilot end of the tube is sandwiched between a mounting plate, which is slotted at opposite ends to receive the tubes, and a centrally apertured yoke on each tube encircling the pilot end thereof, each yoke having spaced apart legs clamped around the side edges of the mounting plate. The '153 reference further discloses that each yoke is welded or brazed to the annular upset bead of the tube with which it is associated in order to effect a fluid-tight seal between the elements and to prevent axial or rotative movement of the yoke relative to the tube. Thus, the '153 reference requires the welding of parts and significantly more weight than is desirable for use in certain applications in order to achieve the mounting of the tubes to the housing of the compressor of the air conditioning system.

From the above, it is clear that there is a continuing need to provide a tube mounting assembly which is lighter, less costly, has the ability to allow for reorientation of the tubes or can prevent rotation of the tube during installation and is simple to install. This is especially true when one considers the changing environments in which air-conditioning systems are used in automotive vehicles. Continuously, space is becoming more and more limited for such parts and air-conditioning systems are being used in a variety of new and different ways. For example, more automotive vehicles are now employing a second evaporator in the rear of the vehicle in order to provide effective air-conditioning to the passengers located in the rear of the vehicle, such as in a minivan.

In order to provide such a device at an economical cost, it is necessary to extend the circuit of the standard air-conditioning system to include the additional evaporator located at the rear of the vehicle to accommodate the occupants in the rear of the vehicle. This means extending both the suction and liquid lines of the standard air-conditioning system to the evaporator located in the rear of the vehicle. On some vehicles lengths in excess of 9 to 10 feet of tubing may be required to reach the rear evaporator. Additionally, in order to conserve space and to meet applicable standards, it is necessary to have the suction and liquid lines conform to the underside of the vehicle, thereby requiring that the suction and liquid line tubes have intricate convoluted shapes.

During the course of shipping these parts it is desirable to keep each associated suction line and liquid line together to make it easy to ensure that the appropriate suction line tube and compatible liquid line tube is correctly installed in each vehicle. In the past, this has been done by initially putting the mounting block over the tubes and then while the tubes are inserted in the mounting block bending the tubes into their desired shape for mounting on the vehicle. However, with the tubes mounted in the mounting block it is difficult and time consuming to bend the tubes into their final form. Additionally, with mounting blocks of the prior art, the holes are drilled completely through the mounting block in order to retain the tube within the mounting block during shipping making it difficult to service an installed line.

In the instances in which the mounting block has a passage which extends from a side of the block for receiving the tube, the means for retaining the tube in the block are complicated, expensive, prone to leakage and do not have the ability to choose between allowing for rotational movement of the tubes or preventing rotational movement of the tube with respect to the block as desired. Thus, it is necessary to provide a means for retaining the tubes within the mounting block which does not significantly add to the cost or the weight of the mounting block and which accommodates for rotational displacement of the tubes with respect to the mounting block.

As discussed above, U.S. Pat. No. 3,869,153 to DeVincent et al discloses a tube mounting assembly having slotted holes in the mounting block for receiving the tubes therein and further discloses a U-shaped yoke used for retaining the tubes in the slotted passages of the mounting plate. However, the yoke of the '153 patent significantly adds to the weight and cost of the assembly due to its size and detailed configuration which requires additional costs, materials and assembly time. Thus, there is still a need for an improved tube mounting assembly which will allow for matching of the tubes, without first being mounted in the mounting plate; will receive the tubes after they have been bent and configured for a particular application; will function to associate a suction line tube with a liquid line tube during shipping and packaging; which has significantly less weight and is less costly and will allow for, when necessary or desirable, reorientation of the tubes during installation in order to account for variances in the orientation of the mounting assembly over the significant lengths required in vehicle installations.

SUMMARY OF THE INVENTION

The present invention relates to an improved apparatus and method for manufacturing a tube mounting assembly. In particular, the present invention relates to a method of manufacturing and installing and an apparatus for mounting suction and liquid line tubes in an air-conditioning circuit in an automotive vehicle. The invention in its preferred embodiment generally includes a mounting block having oppositely disposed slotted passages for receiving the tube (s) in a direction perpendicular to the longitudinal axis of the tube(s) and a single reversible insert located in each of the slots to close the passage and maintain the tube(s) in the slot(s), the insert being aligned and inserted in a direction parallel to the longitudinal axis of the tube.

It is, therefore, an object of the present invention to provide an improved tube mounting assembly for securing a tube or the like to a housing wherein the cost and weight of the assembly are reduced.

Another object of the present invention is to provide a tube mounting assembly wherein it is possible to fabricate and bend the tube assemblies prior to securing the tube in the tube mounting assembly.

It is another object of the present invention to provide a mounting block which can receive liquid and suction line tubes in a direction perpendicular to the longitudinal axis of the tube and can associate and maintain a suction line tube with a liquid line tube for connection to a port in an evaporator, compressor or other similar device.

It is yet another object of the present invention to provide a single insert for use in a tube mounting assembly in which the same insert can be used to retain either the suction line tube or the liquid line tube in its respective slot in the tube mounting assembly.

It is still a further object of the present invention to provide an improved tube mounting assembly for securing suction and liquid line tubes to an evaporator, a compressor or other similar device, which permits field serviceability of a single tube without the need to remove both tubes from the mounting assembly.

Another object of the invention is to provide an improved tube mounting assembly wherein the tube can be retained in a slot in a mounting block using a synthetic material insert.

Yet another object of the present invention is to provide an insert for retaining a tube in a mounting block wherein the insert has a unique configuration thereon for being press fit within a slot of the mounting block.

It is yet another object of the present invention to provide an improved tube mounting assembly which can retain a tube yet allow for rotation of the tube within the assembly.

It is yet another object of the present invention to provide an improved tube mounting assembly which can retain a tube and prevent rotation of the tube within the assembly.

These and other objects of the present invention will become apparent from the following detailed description of the invention with reference being made to the drawings.

BRIEF DESCRIPTION OF THE DRAWINGS

FIG. 1 is an exploded perspective view of a preferred tube mounting assembly of the present invention;

FIG. 2 is a perspective view of one embodiment of the present invention with the tubes assembled to the mounting block and the inserts holding the tubes in place;

FIG. 3 is a plan view of the mounting block of the tube mounting assembly of the present invention;

FIG. 4 is a plan view of the insert used to retain the tubes in the tube mounting block of the present invention;

FIG. 5 is an exploded perspective view of a tube mounting assembly of the present invention showing the non-rotational feature;

FIG. 6 is a perspective view of one embodiment of the present invention with a single tube assembled to the mounting block and a non-rotational insert holding the tube in place;

FIG. 7 is a plan view of the mounting block of FIG. 6 showing the non-rotational insert of the present invention;

FIG. 8 is a plan view of the non-rotational insert used to retain the tubes in the tube mounting block of the present invention;

FIG. 9 is an end plan view of the non-rotational insert of FIG. 8; and

FIG. 10 is a partial view taken along arrows 10—10 of FIG. 7 showing the non-rotational tube of the alternative embodiment of the present invention.

DETAILED DESCRIPTION OF THE PREFERRED EMBODIMENT

Referring generally to FIGS. 1 through 10, FIGS. 1 and 5 show in perspective view a tube mounting assembly 10 and 10 for use with an air-conditioning circuit in an automotive vehicle for connecting a suction line 12 and 112 and a liquid line 14 to a compressor or an evaporator (not shown).

However, as should be understood by one skilled in the art, the present invention is not limited to use in automotive air-conditioning systems. The present invention is usable anywhere where a tube is being connected to a port on a housing. The tube mounting assembly 10 of the present invention essentially includes a mounting block 20 and 120, as best shown in FIGS. 3 and 7, respectively, and inserts 40, 40' and 140 as best shown in FIGS. 2, 4, 8 and 9.

The mounting block 20 of FIGS. 1 through 3 is a substantially H-shaped block or plate and serves as a means for receiving the tube to be connected to the housing. As shown in FIG. 1, the mounting block 20 has a first passage 21 on one end thereof and a second passage 22 on an opposite end thereof for receiving the suction line tube 12 and the liquid line tube 14, respectively. As shown, the first and second passages 21 and 22 are located on opposite sides of the mounting block 20 and are aligned with each other so that they define the H-shaped mounting block 20. However, it is possible that the first and second passages 21 and 22 may be placed in other relative positions in which they are not aligned or are not on opposite sides of the mounting block 20 without departing from the scope of the invention. The position of the passages is dictated by the position of the ports on the device to which the lines are connected.

It is important that the first and second passages 21 and 22 are such that the respective suction and liquid line tubes 12 and 14 to be received in the first and second passages 21 and 22 can be easily inserted or removed from the passages. Additionally, the first and second passages 21 and 22 are designed such that when the tubes 12 and 14 are positioned therein, and the mounting block 20 is connected to the housing (not shown), the mounting block 20 will apply a uniform force around the periphery of annular upset beads 13 and 15 to seal the respective tubes 12 and 14 to the housing. As shown in the mounting block 20 of FIG. 1, this is accomplished by the first and second passages 21 and 22 which contact the tubes 12 and 14 and the beads 13 and 15 for approximately fifty percent of the circumference of the tubes.

The first and second passages 21 and 22 are designed to minimize the amount of material needed to make the mounting block 20 while still providing an appropriate means for ensuring that the tubes 12 and 14 are appropriately connected to the housing and ensure a fluid-tight seal. It should be noted that the mounting block 20 can be used by itself to connect the tubes 12 and 14 to the housing and that the inserts 40 and 40' do not add to the sealing of the tubes 12 and 14 to the housing.

In accordance with the present invention, each of the tubes 12 and 14 are preferably thin walled and of uniform thickness and are provided at one end thereof with the respective annular upset bead 13 and 15 as is well known in the art. For example, the tube 12 is preferably a standard aluminum tube, but may be made out of any other appropriate material, and has the annular upset bead 13 located proximate an end 12a thereof. The bead 13 of the tube 12 may be upset during an upsetting process while manufacturing the tube, as shown, or otherwise provided on the tube in any known fashion such that the bead 13 extends radially outward from the nominal outside diameter of the main body portion of the tube 12. The bead 13 is spaced a predetermined distance from the end 12a of the tube 12 to provide a pilot portion for entry into a passage in the housing to which the tubes are intended to be assembled. An O-ring 16, for providing a fluid-tight seal, is positioned to encircle the pilot portion area between the bead 13 and the end 12a of the tube 12 and is next to the bead 13. The O-ring 16 will be received against a seating portion (not shown) of the housing.

Similar to the tube 12, the tube 14 is provided with the annular upset bead 15 located a predetermined distance from an end 14a of the tube 14 which defines a pilot portion located therebetween for insertion into a respective passage (not shown) of the housing. Also, an O-ring 17 is positioned on the pilot portion area of the tube 14 for sealing the tube 14 with the passage of the housing.

Each of the tubes 12 and 14 have a cover or sheath 18 and 19, respectively, located thereon for protecting the tubes. The ends of the covers 18 and 19 stop a sufficient distance from the upset beads 13 and 15 in order to provide adequate space for the tubes 12 and 14 to be inserted into the mounting block 20. Additionally, the covers 18 and 19 located on the tubes 12 and 14, respectively, are designed to allow the insert 40 and 40' of the present invention to be positioned adjacent the tubes 12 and 14 once they are located in the mounting block 20 as described more fully below.

The protective covers 18 and 19 of the tubes 12 and 14, respectively, are designed to be a means for protecting the tubes when they are installed in an automotive vehicle application. The protective covers 18 and 19 are typically made out of a synthetic material, such as hard plastic, and are intended to prevent the tubes 12 and 14 from being punctured or otherwise broken when they are routed on a vehicle in an area susceptible to external contact, such as the underside of an automotive vehicle chassis. Additionally, the material for the covers 18 and 19 is also chosen to act as insulation. The covers 18 and 19 terminate a set distance from the upset annular beads 13 and 15 of the tubes 12 and 14, respectively, to allow for the insert 40 and 40' to be installed in the block 20.

During the fabrication of the tube mounting assembly 10, typically, the mounting block 20 is fabricated in a process separate from the tubes 12 and 14. In some installations, the tubes 12 and 14 must be bent into intricate forms in order to fit the specific routings for automotive vehicle applications. The pair of passages 21 and 22, as described above, are provided in the mounting block 20, in order to avoid having to position the mounting block 20 directly on either of the tubes 12 or 14 prior to bending of the tube. The first passage 21 located in one side of the mounting block 20 is provided for receiving the tube 12. The second passage 22 is located in a side opposite the first passage 21 for receiving the tube 14. Each of the tubes 12 and 14 are inserted in an end 21a and 22a, respectively, of the first and second passages 21 and 22. The ends 21a and 22a are rounded to have a diameter substantially equal to the nominal outside diameter of the respective tubes 12 and 14 to prevent lateral movement of the tubes. The width or diameter of the first and second passages 21 and 22 is also just slightly greater than the nominal diameter of the tubes 12 and 14 but is less than the diameter of the upset beads 13 and 15 of the respective tubes 12 and 14 to provide axial positioning of the tubes in the respective passages. The sizing between the widths of the first and second passages 21 and 22, the diameters of the tubes 12 and 14 and the diameters of the upset beads 13 and 15 is appropriately chosen such that the tubes 12 and 14 will be positively engaged and securely held to the housing to which the tubes are connected and such that a fluid-tight seal is made between the tubes 12 and 14 and the housing as is known in the art.

The first passage 21 has a pair of slots 23 and 25 on opposite sides of the first passage 21. The slots 23 and 25 are located near the edge of the mounting block 20 and are preferably disposed directly across from each other on opposite sides of the first passage 21. However, it is possible to have the slots 23 and 25 staggered or otherwise arranged without departing from the scope of the present invention. The slots 23 and 25 are substantially rectangular in form.

Similar to the first passage 21, the second passage 22 also has a pair of slots 24 and 26 disposed on opposite sides of the second passage 22 and located near the respective edge of the mounting block 20 near the end of the second passage 22. Similar to the first passage 21, the slots 24 and 26 of the second passage 22 are also substantially rectangular in shape and are preferably disposed directly opposite each other. However, it is also possible to have the slots 24 and 26 offset or staggered. While all of the slots 23 through 26 are disclosed as being of essentially a rectangular or square configuration, it is possible to have the slots of a different configuration such as a triangle or round cross section without departing from the scope of the present invention. As can best be seen in FIG. 3, the slots 23 and 25 and the slots 24 and 26 each form a pair for receiving the insert 40 or 40', respectively. The slots 23 and 25 and the slots 24 and 26 are made to be essentially the same dimension so that the same insert 40 or 40' can fit in either of the pair of slots.

Each of the ends 21a and 22a of the first and second passages 21 and 22 have a respective chamfer or groove 21d and 22d located around the periphery thereof on one side of the mounting block 20 for contacting the upset beads 13 and 15 of the tubes 12 and 14, respectively, to provide a sealing surface. The grooves 21d and 22d function to positively locate the tubes 12 and 14 within the first and second passages 21 and 22 when the mounting block 20 is fastened securely to the housing thereby ensuring a fluid-tight seal between the tubes and the passages of the housing.

The mounting block 20 also has a centrally located bore 28 therein for receiving a bolt (not pictured) which is used as a means for securing the tube mounting assembly 10 to the housing (not shown). While it is possible to use any known means for securing the tube mounting assembly 10 to the housing, a single bore 28 having a bolt (not pictured) therein is a well known and efficient means for securing the tube mounting assembly 10 to the housing.

With specific reference to FIG. 4, the insert 40 for securing the tubes 12 and 14 within the first and second passages 21 and 22, respectively, of the mounting block 20 is shown. It should be noted that the insert 40' of FIG. 1 is identical in every detail to the insert 40. This single insert serves the purpose of securing both tubes 12 and 14 to the connecting block 20. Thus, according to the present invention the same insert 40 can be used to secure different size diameter tubes within different size passages. In the present example, the insert 40 can be used to secure either the tube 12 or the tube 14 within its respective passage by simply reorienting the insert 180°. However, it is necessary to provide an insert for each tube, since two inserts are required to mount two tubes as is shown in the present invention. However, it should be noted that it is possible to have a tube mounting assembly 10 in which the same insert would secure more than one tube to the mounting block for connection to the housing. Accordingly, there are fewer parts required since the inserts 40 and 40' are identical.

The insert 40 has a first side end 41, a second side end 42 and a pair of winged tabs 43 and 43', as described below. The width of the first side end 41 of the insert 40 corresponds to the width of the first passage 21 and has a radial end form selected to retain the tube 12 within the end 21a of the first passage 21 when the tabs 43 and 43' of the insert 40 are positioned in the slots 25 and 23, respectively. Thus, the width of the first side end 41 approximately corresponds to the width of the first passage 21 of the mounting block 20. The first side end 41 has a radial end form with a partial concave surface 46 which corresponds to the form and diameter of the tube 12. Thus, the first side end 41 of the insert 40 functions as a means for securing the tube 12 within the first passage 21 in the mounting block 20.

The second side end 42 of the insert 40' which corresponds to the second passage 22 is configured to retain the tube 14 within the end 22a of the second passage 22 when the tabs 43 and 43' of the insert 40' are positioned in the slots 26 and 24, respectively. Thus, the width of the second side end 42 of the insert 40' approximately corresponds to the width of the second passage 22 of the mounting block 20. The second side end 42 also has a radial end form with a partial concave surface 47 which corresponds to the form and diameter of the tube 14. Thus, the second side end 42 of the insert 40' functions as a means for securing the tube 14 within the second passage 22 in the mounting block 20.

It is necessary to provide a means for securing the insert 40 within the first and second passages 21 and 22. A first means for securing the insert 40 within the first passage 21 is to press fit the first side end 41 within the first passage 21. However, it is more preferable to have the pair of winged tabs 43 and 43' to serve as the means for securing the insert 40 in the first passage 21 of the mounting block 20. Preferably, the tabs 43 and 43' are press fit within the slots 25 and 23, respectively, after the tube 12 has been positioned in the first passage 21.

In order to ensure that the insert 40 will not fall out of the slots 23 and 25 and the first passage 21, the tabs 43 and 43' are formed to be wider at the mid portion 43a and narrower at the ends 43b and 43c of the tabs 43 and 43'. The ends 43b and 43c have a width which is narrower than the width of the slot 25 so they are easily inserted and thereafter moved to a final position within the slot. As the insert 40 is pushed further into the first passage 21, the width of the tab 43 gets wider so that the tab 43 becomes press fit in the slot 25. The tab 43' has a shape similar to that of the tab 43 and therefore becomes press fit within the slot 23.

The insert 40' for retaining the tube 14 in the slot 22 is similar to the insert 40 as described above. However, as stated above, the second side end 42 is used to slide into the second passage 22 of the block 20. Accordingly, the second side end 42 of the insert 40 has a width which corresponds to the width of the second passage 22. The tabs 43 and 43' are now received within and press fit in the slots 26 and 24, respectively, of the second passage 22 to secure the tube to the block 20 as described above.

To manufacture the present invention, it is necessary to provide the mounting block 20 having the first and second passages 21 and 22 formed therein. The mounting block can be fabricated using any known method such as casting, molding or extruding. The slots 23, 24, 25 and 26 can be formed in the passages during the fabricating process or they can be machined in the block 20 at a later time. However, as should be known in the art, it is more economical to form the slots 23 through 26 during the fabrication of the block 20.

The block is also formed with the bore 28 centrally located therein. The grooves 21d and 22d in the ends 21a and 22a of the first and second passages 21 and 22, respectively, may also be formed during the block fabricating process or may be machined in later.

The insert 40 is preferably made of a synthetic material such as nylon and is therefore preferably made in a rapid injection molding process. However, it is possible to make the insert 40 using any known process without departing from the scope of the present invention. The tubes 12 and 14 are also made using any known process.

To assemble the present invention, once the necessary parts have been manufactured, either of the tubes 12 or 14 is positioned within its respective passage 21 or 22 within the block 20 so that the distance between its respective upset bead 13 or 15 and the block permits the insert to be placed on the tube and positioned in the groove 21d or 22d. Next, the corresponding side end 41 or 42 and the tabs 43 and 43' are aligned with the corresponding slots 25 and 23 or 26 and 24 and the tube 12 and insert 40 are pushed toward the block. During this motion, the insert 40 is press fit into position such that the tube 12 or 14 is secured to the block 20 and the bead 13 or 15 is seated against the chamfer or groove 21d and 22d. Next, the above procedure is repeated for the other tube 12 or 14.

Once both tubes 12 and 14 are located and secured within their respective passages 21 and 22 and the O-rings 16 and 17 are positioned on the ends 12a and 14a of the tubes 12 and 14, the mounting block 20 is aligned so that the ends 12a and 14a of the tubes 12 and 14 can be inserted into the corresponding passages in the housing. Once the tubes 12 and 14 are in position in the housing, a bolt (not pictured) is passed through the bore 28 and received in a corresponding threaded hole (not pictured) in the housing to secure the mounting block 20 and the tubes 12 and 14 to the housing. The bolt is tightened appropriately to effect a fluid-tight seal between the tubes 12 and 14 and the housing.

It should be apparent from the above, that if one of the tubes 12 or 14 need maintenance or replacement, it will now be much easier to perform such maintenance or replacement. For example, if the tube 12 is to be replaced, the bolt (not pictured) is removed from the bore 28 to free the mounting block 20 from the housing. Next, the tube and insert 40 are pushed forward so as to dislocate the insert 40 from the slots 25 and 23 of the first passage 21 and the insert 40 is simply removed to allow the tube 12 to be removed from the first passage 21. A new tube and/or insert can easily be put in place and the tube 12 and insert 40 are then reinserted in the slots 25 and 23 of the first passage 21 as discussed above. The same process can be followed for the tube 14 if it requires maintenance.

It will be appreciated that the above described mounting block assembly 10 allows for reorientation of the tubes 12 and 14 during installation and maintenance whereas the mounting block assembly 110 prevents rotation of the tube 112 once the insert 140 has been located in the slots 125 and 123. As discussed above, when a tube mounting assembly is used in a vehicle having a rear evaporator or like device, it is necessary to make the tubes 12 and 14 very long. Thus, during installation it becomes necessary to reorientate the tubes 12 and 14 to properly install the tubes 12 and 14 and to account for the variations in manufacturing tolerances between the tubes 12 and 14 and other vehicle tolerances. In the embodiment of the present invention shown in FIGS. 1 through 4, it is very simple to turn or reorientate the direction of the tubes 12 and 14 during installation in the vehicle to overcome these variations with a minimal amount of effort, due to the fact that no welding is needed and that the insert 40 is connected to the mounting block 20 independent of the tubes 12 and 14.

It should also be noted that in different situations, it will be desirable not to have the suction or liquid line tubes rotate once they have been installed in the block 20. Accordingly, the alternative embodiment shown in FIGS. 5 through 10 shows a tube mounting assembly 110 similar to the tube mounting assembly 10 shown in FIGS. 1 through 4. The tube mounting assembly 110 is very similar to that of FIGS. 1 through 4 and the corresponding elements are numbered the same where appropriate but have 100 added thereto. The tube mounting assembly 110 of FIGS. 5 through 7 is designed to utilize an insert 140 having a shaped first side 141 and shaped second side 142 which matches a depression 152 shaped complementary to the first or second sides 141 and 142 and located in the tube 112 a distance from the end 112a.

The depression 152 is preferably shaped to prevent rotation of the tube 112 within the passage 121 of the mounting block or base 120. In the present embodiment, the mounting block 120 is shown as having the passage 121 located in an end thereof and the second tube (not shown) is to be located in the passage 122. In the present embodiment, it is preferable to have the mounting block 120 associated with only one of the tubes of the tube mounting assembly 110. This is advantageous since it allows for the first tube 112 to be packaged with the tube mounting assembly 110 connected thereto and the second tube (not pictured) to be packaged separately. However, it is possible to have both tubes connected to the tube mounting assembly 110 utilizing inserts 140 if desirable.

The insert 140 is shown as having a first side 141 and a second side 142. Similar to the embodiment of FIGS. 1 through 3, it is possible to have the first and second sides 141 and 142 have widths which are identical or different depending upon the particular application. The first and second sides 141 and 142 are each preferably designed to have an obelisk shape. The obelisk shape of the first and second sides 141 and 142 is essentially that of a frustum of a pyramid. However, it is possible to have the first and second sides 141 and 142 have other shapes which will prevent the first tube 112 from rotating within the passage 121, from translating within the passage 121 and will allow for the insert 140 to be installed as described.

The obelisk shape of the first and second sides 141 and 142 results in flat surfaces 146 and 147. The flat surface 146 has four angled surfaces 148 located between it and the tabs 143 and 143' as best shown in FIGS. 8 and 9. Similarly, the flat surface 147 results in four angled surfaces 149. Since the tube 112 has the depression 152 located therein which is complementary to the first and/or second sides 141 and 142, the depression 152 also has a flat 157 and angled surfaces 159 as best shown in FIG. 10.

Preferably, the depression 152 is formed in the tube 112 preferably during the processing of the tube to form the upset bead 113. However, it is possible to form the depression 152 at any point during the manufacturing process. During the manufacturing process, a fixture (not shown) holds the tube 112 while an end forming machine creates the upset bead 113 using technology well known in the art. In order to form the depression 152 in the tube 112 in a cost-effective manner, the fixture is modified such that when it clamps down on the tube 112, it creates the depression 152 at the same time and the end forming process which normally takes place occurs in its normal sequence. It should be noted that the tube 112 is placed in the machine in a uniform manner to ensure that when the depression 152 is properly aligned in the passage 121 and the insert 140 is inserted therein, the mounting block 120 will be properly aligned with the passages of the housing (not shown).

All of the angled surfaces noted above are preferably formed having an angle from their respective flat which is between 10° and 55° and preferably the angle is approximately 20° from the flat. This angle has proven to provide sufficient interference between the insert 140 and the depression 152 such that the insert is forcibly held within the passage 121 of the mounting block 120 and cannot be removed therefrom under normal manufacturing, shipping and operating conditions. The angle between the flat 146 and the angled surfaces 148 is preferably greater than the angle between the flat 157 and the angled surfaces 159 of the depression 152 such that the flat 146 will completely contact the flat 157 as best shown in FIG. 7.

In the present embodiment, the tabs 143 and 143' are preferably designed to have a width which is sized just slightly larger than the width of the slots 123 and 125, respectively. This prevents the insert 140 from moving during the manufacturing process in the passage 121. Thus, there is a minimal interference fit between the tabs 143 and 143' of the insert 140 and the slots 125 and 123, respectively.

It is possible to have no interference fit and to retain the insert 140 within the passage 121, using a spike mark 154 located in an end of the mounting block 120 proximate the insert 140 resulting in a bulge 156 which presses against the tab 143 in the slot 125. Accordingly, the insert 140 is locked within the passage 121. The spike mark 154 is formed in the end of the mounting block 120 using any known forming technique such as a hammer and punch or a pneumatically driven punch machine.

The insert 140 is shown to have first and second sides 141 and 142 which are approximately the same size. However, it is possible to have the device shown in FIGS. 5 through 10 have the first and second sides 141 and 142 differently sized in order to use the same insert 140 in multiple applications similar to the insert 40 shown in FIGS. 1 through 4.

It will be appreciated that the present invention has been set forth by way of nonlimiting preferred embodiments. It is possible to make modifications and changes without departing from the scope of the present invention. Accordingly, the present invention is to be limited only by the following claims.

What is claimed is:

1. A mounting block apparatus adapted to mount a conduit member having a longitudinal axis, said mounting block apparatus comprising:

a housing having at least one U-shaped passage therein, said at least one U shaped passage defining a part cylindrical through passage and a slotted portion extending transversely from said through passage to a perimeter area of said housing, said at least one U-shaped passage adapted to receive one end of said conduit member, said through passage having a longitudinal axis, said housing further comprising:

a first groove in said slotted portion of said housing, said first groove having a longitudinal axis substantially aligned with said longitudinal axis of said through passage, said first groove being located on one side of said slotted portion of said at least one U-shaped passage; and a second groove in said slotted portion of said housing oppositely disposed to said first groove in an opposite side of said slotted portion of said at least one U-shaped passage; and an insert having a first tab located at one side thereof, said first tab being removably mounted in said first groove of said housing; a second tab located on an opposite side of said insert, said second tab being removably mounted in said second groove of said housing, each of said first and second tab having an upper surface and a lower surface opposite said upper surface; a first shoulder portion extending in a direction away from said lower surface of each of said first and second tabs between said one and said opposite sides of said insert and into said slotted portion of said at least one U-shaped passage; a second shoulder portion extending in a direction away from said upper surface of each of said first and second tabs between said one and said opposite sides of said insert and into said slotted portion, said first and second shoulder portions having oppositely disposed terminal end forms adapted to communicate with said conduit member such that when said insert is mounted to said housing an opening is defined in said at least one U-shaped passage adapted to provide a nest for said conduit member.

2. The apparatus of claim 1 wherein said first groove and said second groove each have a predetermined thickness, and further wherein said first tab of said insert has a first predetermined thickness less than the predetermined thickness of said first groove and a second predetermined thickness slightly greater than the predetermined thickness of said first groove;

whereby a frictional interference fit is created between said first tab of said insert and said first groove.

3. The apparatus of claim 1 wherein said housing has a second U-shaped passage therein positioned with respect to said at least one U-shaped passage for receiving a second conduit member to be mounted to said housing, said second U-shaped passage defining a part cylindrical through passage and a slotted portion extending transverse from said through passage to a perimeter area of said housing; and said apparatus further comprising means for securing said second conduit member in said second U-shaped passage, said means for securing comprising:

a first groove in said slotted portion of said second U-shaped passage, said first groove having a longitudinal axis substantially aligned parallel with the longitudinal axis of said second conduit member located in said second U-shaped passage;

a second groove in said slotted portion of said second U-shaped passage, said second groove oppositely disposed to said first groove in an opposite side of said slotted portion of said second U-shaped passage; and a second insert having a first tab located in said first groove of said second U-shaped passage and a second tab located in said oppositely disposed second groove of said second U-shaped passage, whereby when said second insert is mounted to said housing an opening is defined in said second U-shaped passage adapted to provide a nest for said second conduit member.

4. The apparatus of claim 3 wherein said first shoulder portion of said insert has a width corresponding to a width of said at least one U-shaped passage in said housing, and further wherein said second shoulder portion has a width different than the width of said first shoulder portion of said insert.

5. The apparatus of claim 1 wherein said housing has a second U-shaped passage therein for mounting a second conduit member to said housing, said apparatus further comprising:

a second insert located in second U-shaped passage, said second insert having a shoulder portion conforming with said second conduit member.

6. The apparatus of claim 3 wherein said first shoulder portion of said insert has a width corresponding to the width of said at least one U-shaped passage in said housing and wherein said second shoulder portion of said insert has a width different than the width of said first shoulder portion of said insert; and wherein said second insert further comprises a first shoulder portion having a width corresponding to the width of said second U-shaped passage of said housing so as to conform said second conduit member, and a second shoulder portion having a width corresponding to the width of said at least one first U-shaped passage of said housing and conforming to said first conduit member;

whereby said insert can be used in one of said at least one and said second U-shaped passages and said second insert can be used in one of said at least one and said second U-shaped passages.

7. The apparatus of claim 1 wherein said terminal end forms of said insert have a predefined shape.

8. The apparatus of claim 1 wherein said terminal end forms of said insert have the form of an obelisk.

9. The apparatus of claim 1 wherein said housing further comprises a bulge located in one of said first and second grooves in said U-shaped passage such that a frictional interference is created between one of said first and second tabs of said insert and a respective one of said first and second grooves of said U-shaped passage.

10. The mounting block apparatus of claim 1 further comprising means for wedging said insert into said first and second grooves such that a frictional interference is created between one of said first and second tabs of said insert and a respective one of said first and second grooves of said U-shaped passage.

11. The apparatus of claim 10 wherein said means for wedging further comprises a spike mark and a bulge formed in one of said first and second grooves, said bulge contacting one of said first and second tabs located in one of said first and second grooves of said U-shaped passage.

12. An insert adapted to retain a conduit member in a mounting block passage, said insert comprising:

a central body portion having a predetermined width;

a first segment portion having a first end integral with said central body portion and a second end extending in a direction opposite said first end;

a second segment portion having a first end integral with said central body portion and a second end extending in a direction opposite said first end of said second segment portion, said first and second segment portions each having a width less than the predetermined width of said central body portion; and said second end of said first segment portion having a first chamfered terminal end form adapted to communicate with said passage in said mounting block to redefine said passage such that said redefined passage is adapted to provide a nest and retain said conduit member.

13. The insert of claim 12 wherein said width of said first segment portion of insert is different than said width of said second segment portion of said insert.

14. A mounting block apparatus adapted to mount a conduit member to a housing, said mounting block apparatus comprising:

said housing having a U-shaped passage therein, said U-shaped passage defining a part cylindrical through passage and a slotted portion extending transverse from said through passage; a first groove in said slotted portion of said U-shaped passage, said first groove being aligned with said slotted portion of said U-shaped passage, said first groove being located in a first side of said slotted portion of said U-shaped passage; and a second groove in said slotted portion of said U-shaped passage, said second groove being aligned with said slotted portion of said U-shaped passage, said second groove being located in an opposite second side of said slotted portion of said U-shaped passage; and an insert having a first tab along one side thereof, said first tab being located in said first groove of said first side of said slotted portion of said U-shaped passage and a second tab along an opposite side thereof, said second tab being located in said second groove of said opposite second side of said slotted portion of said U-shaped passage;

each of said first and second tabs having an upper surface and a lower surface opposite said upper surface; a first shoulder portion extending in a direction away from said lower surface of each of said first and second tabs between said one and said opposite sides of said insert and into said slotted portion of said U-shaped passage; a second shoulder portion extending in a direction away from said upper surface of each of said first and second tabs between said one and said opposite sides of said insert and into said slotted portion, said first and second shoulder portions having oppositely disposed terminal ends adapted to communicate with said conduit member such that when said insert is mounted to said housing an opening is defined in said U-shaped passage adapted to provide a nest for said conduit member.

15. The apparatus of claim 14 wherein said oppositely disposed terminal ends of said insert are in the form of an obelisk.

* * * * *

UNITED STATES PATENT AND TRADEMARK OFFICE
CERTIFICATE OF CORRECTION

PATENT NO. : 5,860,681
DATED : January 19, 1999
INVENTOR(S) : Robert J. Slais

It is certified that error appears in the above-identified patent and that said Letters Patent is hereby corrected as shown below:

Title page, reference numeral [57], line 20, kindly delete "complimentary"

and insert ---- complementary ----.

Column 2, line 31, kindly delete "air conditioning" and insert

---- air-conditioning ----

Column 4, line 65 kindly delete "10" and insert ---- 110 ----.

Column 11, line 42, kindly delete "U shaped" and insert ---- U-shaped ----.

Column 12, line 61, after "located in" kindly insert ---- said ----.

Column 13, line 24, kindly delete "mounting block".

Column 14, line 5, after "portion of" kindly insert ---- said ----.

Signed and Sealed this

Twenty-fourth Day of August, 1999

Attest:

Q. TODD DICKINSON

*Attesting Officer*  *Acting Commissioner of Patents and Trademarks*